UNITED STATES PATENT OFFICE.

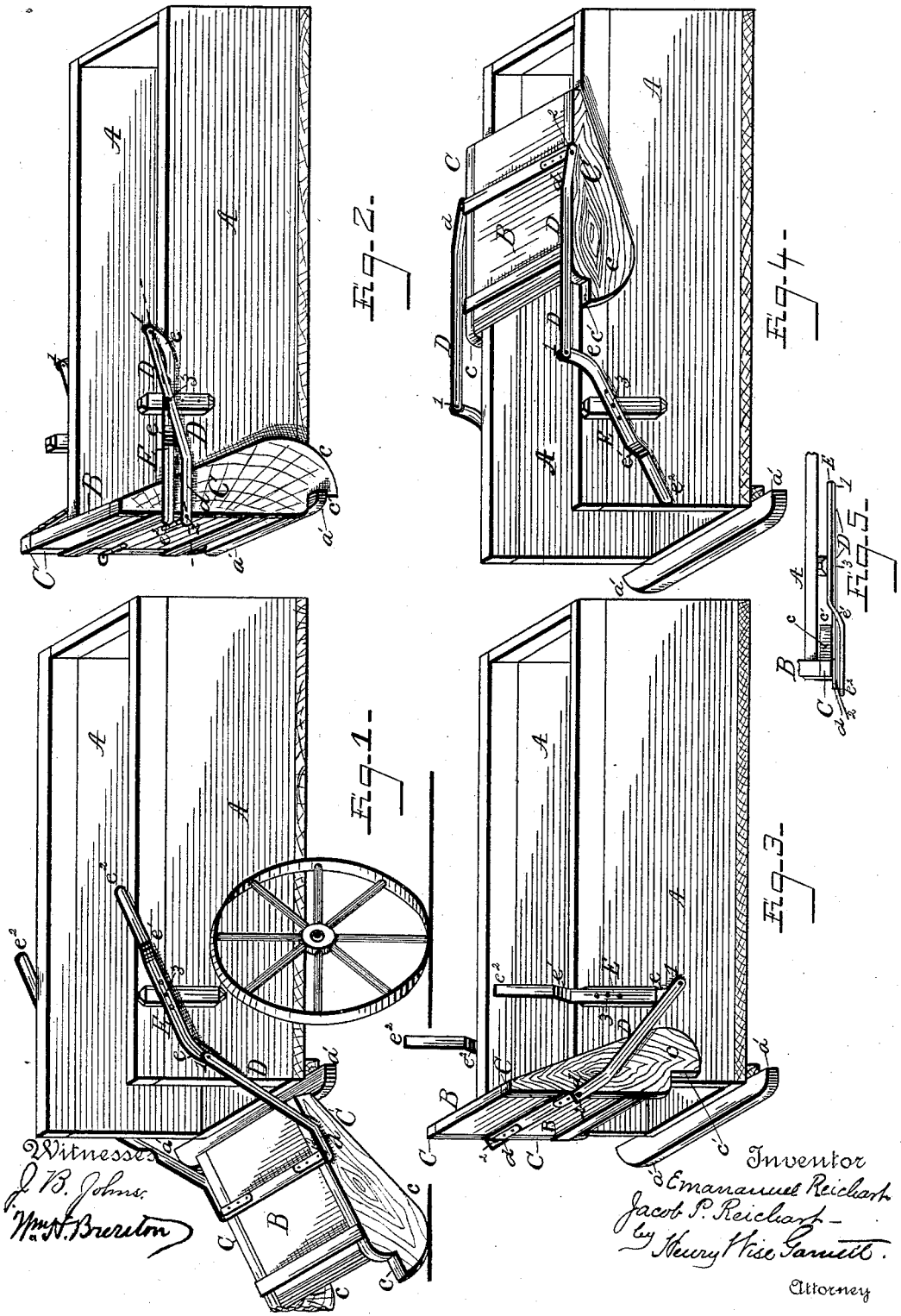

EMANUEL REICHART AND JACOB P. REICHART, OF NEOLA, IOWA.

END-GATE FOR WAGONS.

SPECIFICATION forming part of Letters Patent No. 390,253, dated October 2, 1888.

Application filed April 9, 1888. Serial No. 270,015. (No model.)

*To all whom it may concern:*

Be it known that we, EMANUEL REICHART and JACOB P. REICHART, citizens of the United States, residing at Neola, in the county of Pottawattamie and State of Iowa, have invented a certain new and useful Improvement in End-Gates for Wagons; and I do hereby declare the following to be a full, clear, and exact description of the invention, such as will enable others skilled in the art to which it appertains to make and use the same.

Our invention is an improvement in end-gates for wagons; and our said invention consists in certain details of construction of the parts composing the same, as and for the purposes hereinafter more fully explained, and forming the subject-matter of the appended claim.

The object of this invention is to provide an end-gate for wagons that will be capable of a variety of uses—first, as a tail-board or end-gate, in which position it is securely locked from accidental displacement; second, as a seat for the driver; third, as an inclined way or platform for loading and unloading barrels, &c., or animals from the wagon; and, fourth, as a sliding tail-board or end-gate for discharging grain; to accomplish which several objects we proceed as follows, reference being had to the accompanying drawings for a better understanding of the details of construction of the parts composing an end-gate for wagons constructed according to our invention, and in which drawings—

Figure 1 is a view in perspective of our end-gate as applied in position and securely locked upon an ordinary wagon-body. Fig. 2 is a similar view representing the said end-gate in position as a seat for the driver; Fig. 3, the same when in position as an inclined way or platform for loading and unloading animals, barrels, &c., from the wagon; and Fig. 4, a similar view illustrating the end-gate slightly raised to discharge a load of grain. Fig. 5 is a detail plan view, on an enlarged scale, illustrating the position of the pivoted arms or levers by which the end-gate is held in place to the wagon-body when said end-gate is locked in position against the end of said wagon-body, as in Fig. 1.

A designates the wagon-body, and B the end-gate thereof, which end-gate is of such length that when turned over with its top end resting upon the floor of the wagon-body its lower edge will rest at an angle upon the ground to form an inclined way, as shown in Fig. 3.

C C are the sides of the gate, which have a curved enlarged lower part, $c$, and seat $c'$, to engage the cross-bar $a$ of the wagon and thus hold the gate in position at its lower end. The end-gate is of such width relatively to the width of the wagon-body that the side pieces, C C, of said gate will be upon the outside of said body, and to secure the said gate in place to the wagon-body and adapt it to be used in the several positions hereinbefore explained two compound peculiarly-bent levers, D and E, are employed, of about equal length and pivoted together at one of their ends, as at 1. The other end of the arm D is bent at a slight angle, as at $d$, and pivoted to the end gate near the top thereof, as at 2. The other lever, E, is pivoted, as at 3, to the wagon-body, and the end thereof that is pivoted to the arm D is curved upward, as at $e$, while midway between its other or free end and the pivot-bearing 2 said arm or lever E is bent outward almost at a right angle, as at $e'$, and then again bent forward so as to bring said free end of this bar E across the other bar, D, when the gate is in the position shown in Fig. 1, for the purposes as will presently appear.

The object of forming the upward curve $d$ to the bar D, and a similar upward curve $e$ to the bar E, both of which curves or bends are in the direction of the edge or narrow portion of said bars, is to bring the pivot-bearings 1 2 3 in a line with each other or at a dead-center, as shown in dotted line, Fig. 1, and thereby securely lock the end-gate to the wagon and prevent its accidental displacement, or until the positions of the levers are changed, which can only be accomplished by raising the outer end, $e^2$, of the arm E, when the line of pressure passes below the pivot 3, as shown in Fig. 4, and the gate may be raised or tilted backward. The angle $e'$ in the bar E comes against the bar D when the gate is locked, as in Fig. 1. Thus the movement of said bar E is limited and its passage below the said bar D and across the line of centers, as before explained, is prevented; in other words, the angle $e'$ forms a stop for the lever E and prevents the handle $e^2$ thereof from going past the bar D and the consequent disarrangement of the line of centers.

As hereinbefore stated, the end-gate is of such length that with its top end resting upon the cross-bar $a$ of the wagon-body its other end will rest at an angle upon the ground, as in Fig. 3, and the two arms or levers D and E, by which the said gate is held to the wagon and locked in position thereon, are also of such length relatively to the length of the wagon-body that the said gate may be used as a seat, as shown in Fig. 2, to do which the lever E is first raised, as in Fig. 4, and then carried forward and depressed, as in Fig. 2, the end-gate at the same time being lifted above the end of the wagon-body and slid upon the top thereof until brought to the position shown in Fig. 2.

To assume the position shown in Fig. 3, the lever E, as also the end-gate, is slightly raised, as in Fig. 4, in which position loose grain, &c., may be discharged from the wagon and the top end of the gate pressed forward and then downward until its top end reaches the bottom of the wagon-body, as in Fig. 3, when the levers D and E will be in about a straight line, as shown, and thereby aid in supporting the top of the gate when in this position.

Having thus fully described our invention, we claim—

The combination, in a wagon end-gate, with the gate B, having the side pieces, C C, and seat $c'$, and wagon-body having the cross-bar $a$, adapted to engage the seat $c'$ of the sides of the gate and thus hold the lower end of said gate in place, of the two levers D and E, of about equal length, pivoted together at 1 to the end-gate at 2 and to the wagon-body at 3, the lever D being formed with a curve or bent end at $d$, and the lever E formed with a curved or bent end at $e$, angular bend $e'$, and handle $e^2$, as and for the purposes described and shown.

EMANUEL REICHART.
JACOB P. REICHART.

Witnesses:
S. N. HARVEY,
C. M. CRIPPEN.